United States Patent [19]

Goldberg et al.

[11] Patent Number: 4,745,804
[45] Date of Patent: May 24, 1988

[54] ACCRETION TYPE ICE DETECTOR

[75] Inventors: Joshua I. Goldberg, Woodbridge; Kenneth M. Harley, Fairfield, both of Conn.

[73] Assignee: Dataproducts New England, Inc., Wallingford, Conn.

[21] Appl. No.: 938,834

[22] Filed: Dec. 8, 1986

[51] Int. Cl.$^4$ .................. G01W 1/00; G08B 19/02
[52] U.S. Cl. ............................. 73/170 R; 340/580
[58] Field of Search ..................... 73/170 R, 818; 244/134 F; 340/580, 601, 602, 962

[56] References Cited

U.S. PATENT DOCUMENTS 3,541,540 11/1970 Hughes ..................... 244/134 F X
4,553,137 11/1985 Marxer et al. ............. 244/134 F X Primary Examiner—Charles A. Ruehl
Attorney, Agent, or Firm—Bachman & LaPointe

[57] ABSTRACT

An atmospheric probe for detecting the occurrence and measuring the extent of ice accretion upon the probe.

30 Claims, 2 Drawing Sheets

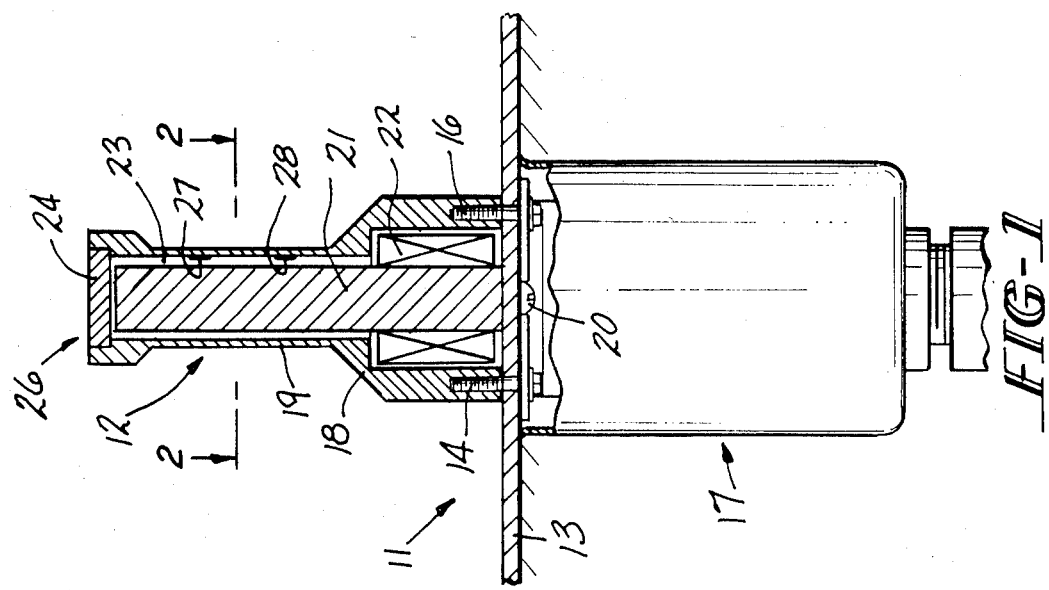
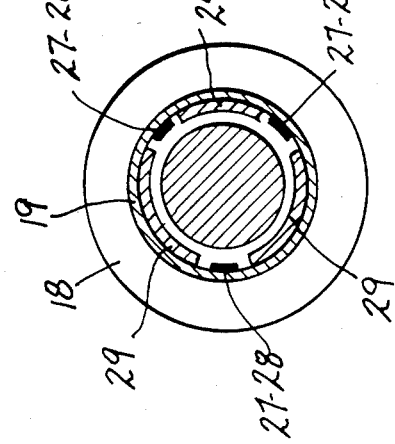
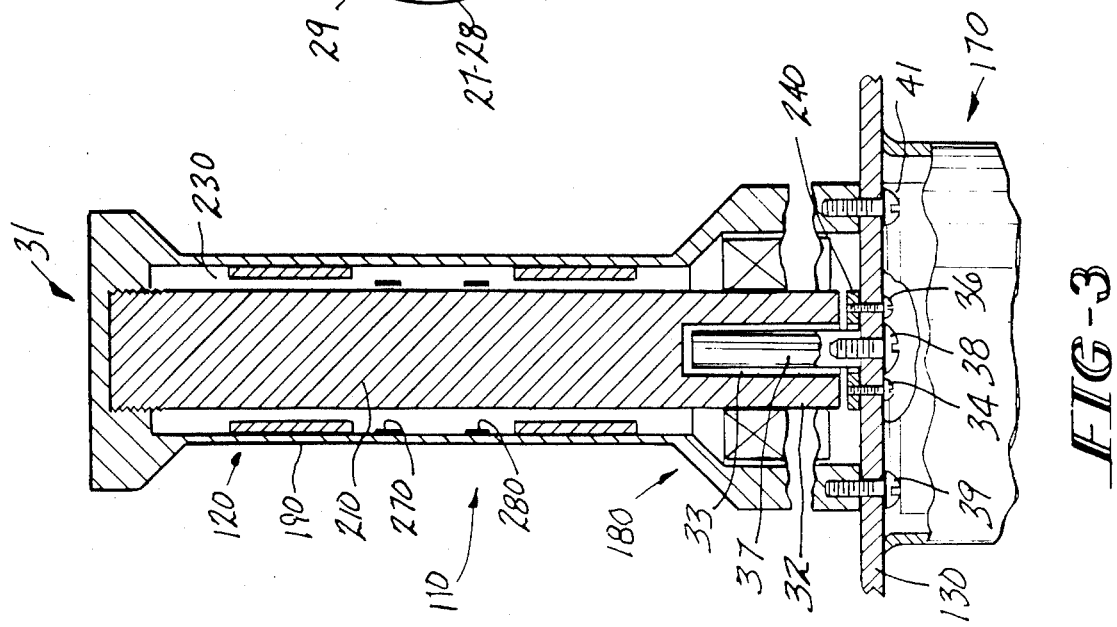

4,745,804

ACCRETION TYPE ICE DETECTOR

BACKGROUND OF THE INVENTION

The present invention relates to atmospheric probes and relates in particular to probes for detecting the occurrence and the build-up of ice to avoid personal injury, loss of life and property loss or damage.

Such probes are useful to monitor the occurrence of and the build-up of ice upon aircraft, surface craft, power lines and aerial structures in general.

Typical prior art devices for indicating the accretion of ice, are disclosed and described in a series of U.S. Pat. Nos. 3,996,787, 4,053,127 and 4,095,456, issued on Dec. 14, 1976, Oct. 11, 1977 and June 20, 1978, respectively to Geoffrey Edgington and assigned to Lucas Industries, Ltd. The Edgington patents deal with a gas system where ice accretion causes (1) orifice restriction, (2) diaphram deflection, or (3) a pressure differential in the system.

A further disclosure appears in U.S. Pat. No. 4,553,137, issued Nov. 12, 1985 to Marxer et al. in which the change in frequency of a vibrating element is related to the build-up of ice.

These inventions appear to be limited to aircraft applications and involve vibratory or rotating elements or other movable members exposed directly to the these prior art devices are prone to generate confusing signals in snow, slush, sleet and rain.

SUMMARY OF THE INVENTION

In contrast, the present invention relates to an accretion type ice detector which is useful in a wide variety of atmospheric conditions and locations.

A primary feature of the present invention is the provision of a sealed probe or protrusion fixed to a support member with no exterior moving pieceparts.

A further feature of the invention is the provision of an atmospheric probe whose compressive strength varies with the accretion of ice on the exterior of the probe. Variations in compressive strength create variations in strain which are read and reported by strain gauge means mounted on the interior of the probe. The power means for creating the stress are also located in the interior of the probe.

Thus, a further feature of the invention is the provision of an internal electromagnetic device for stressing the probe periodically and the strain variations are monitored by the aforesaid strain gauge.

Therefore, the probe operation and structure involves method and apparatus inventions.

A method of detecting the initial occurrence and subsequent accretion of ice upon a probe exposed to the atmosphere where strain resulting from compressive stress of the probe is proportional to accretion of ice upon the probe embracing certain principles of the present invention may comprise providing a protrusion having a surface (weather surface) exposed to weather, stressing said surface compressively under a given load in an ice free condition to produce strain or deformation, measuring said strain, stressing said surface compressively under the same load in an ice accreted condition, measuring said strain in said ice accreted condition, comparing the strain measured in the ice free condition to the strain measured in the ice accreted condition, and utilizing the results of the comparison as an indication of the occurrence of ice accretion and as an indication of the degree of ice accretion.

An apparatus embracing certain other principles of the invention may comprise a tubular probe or protrusion having a surface (weather surface) exposed to the atmosphere, power means for stressing the protrusion under a predetermined compressive load sufficient to deform the protrusion in ice free and in ice accreted conditions, and measuring means for measuring the extent of deformation in each of said conditions whereby a comparison of said deformation measurements is useful as a measure of the occurrence and of the extent of ice accretion.

Other features and advantages of the present invention will become more apparent from an examination of the succeeding specification when read in conjunction with the appended drawings in which,

BRIEF DESCRIPTION OF THE DRAWINGS

FIG. 1 is a side view, partially in section, of a typical accretion detector mounted upon a support member.

FIG. 2 is a horizontal section of the illustration of FIG. 1 in the plane of the line 2—2 as viewed in the direction of the arrows.

FIG. 3 is a vertical section of an alternative embodiment of the invention, and

DESCRIPTION OF THE PREFERRED EMBODIMENTS

Figure 4:
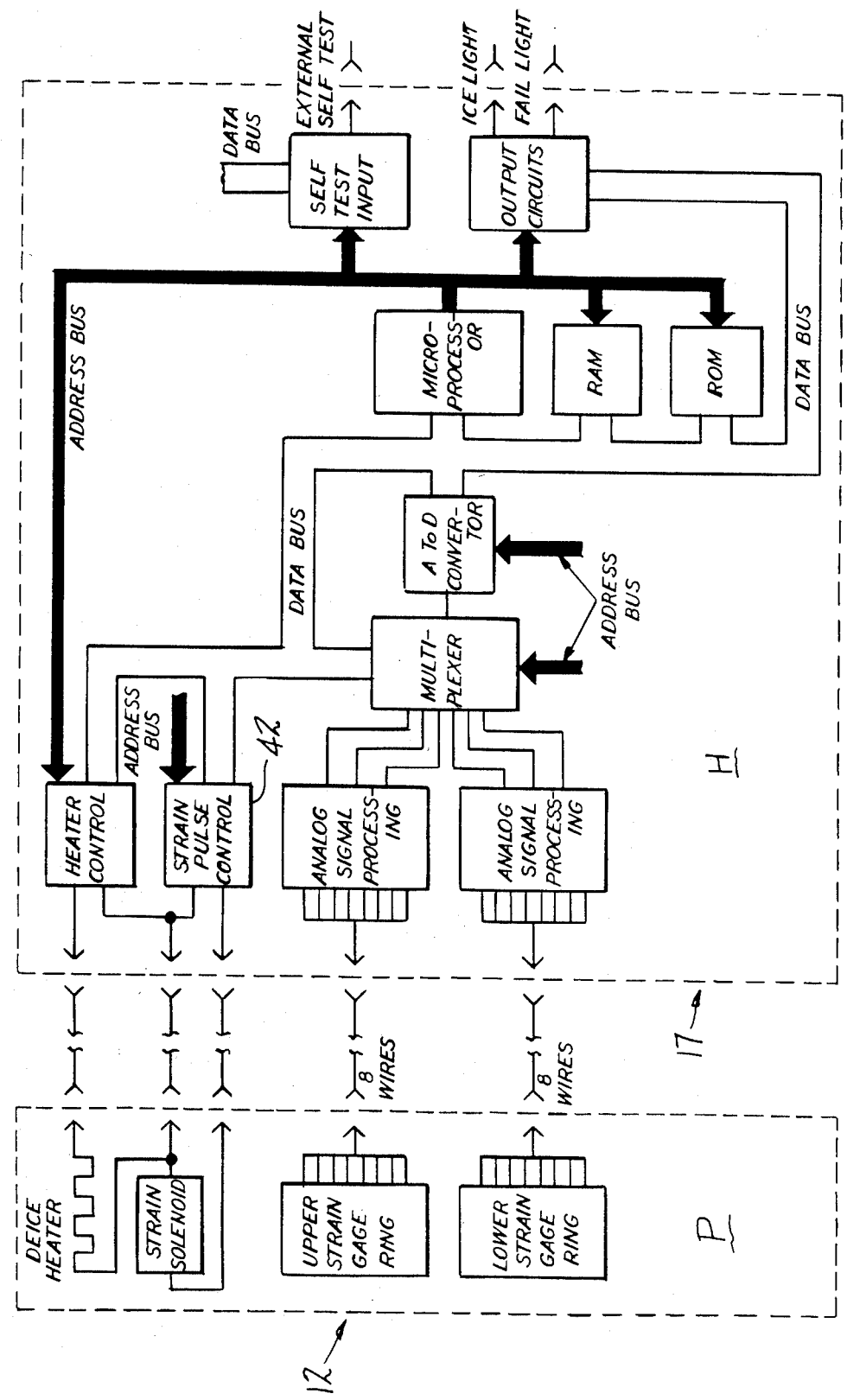
FIG. 4 is a block diagram of the electrical circuitry associated with the ice accretion detector.

Referring in detail to the drawings the reference numeral 11 designates an ice accretion detector of the present invention including a tubular probe or protrusion 12 fixed to one side of a support member 13 by fastening means such as machine screws 14 and 16.

A circuitry housing 17 is secured by suitable means (not shown) to the opposite side of the support member.

In the FIG. 1 embodiment, the probe includes a tubular body segment 18, fabricated of metal or a suitable synthetic resin, tapering to a smaller tubular portion having a sidewall 19 spaced from and surrounding a magnetic core 21 secured to the support member 13 by machine screw 20. The lower end of the magnetic core 21 is surrounded by an electric exciting coil 22.

The entire exterior of the probe 12, in particular the exterior surface of the sidewall 19, is exposed to the atmosphere, in normal operation, and the exterior of the probe is sealed and is weather tight.

An annular air space 23 separates the magnetic core 21 and the interior surface of the sidewall 19. An armature 24 is recessed and fixed in the upper extremity of the probe as indicated by the reference numeral 26. The armature is spaced from the upper end of the magnetic core.

Mounted to the interior surface of the relatively thin sidewall 19 are a plurality of strain gauges 27 and 28.

As is most apparent in FIG. 2 a heating means in the form of an electric thermal blanket 29 is disposed in the annular space 23 to thaw the probe and remove accreted ice, as desired.

FIG. 3 shows an alternative embodiment in which the magnetic core 210 is secured in reverse fashion. That is, the core 210 is in threaded engagement with the tubular probe 120 at its upper end as indicated by the reference numeral 31.

The opposite end 32 of the core 210, formed with a bore 33, is spaced from an armature 240. The armature is fixed to supporting member 130 by machine screws 34 and 36.

A guide pin 37, secured to the support member 130 by a machine screw 38, is received in the bore 33 and makes a sliding fit with the core 210. The magnetic core 210 is surrounded by an exciting coil 220.

As is the case with the FIG. 1 embodiment, the body segment 180 of the ice accretion detector 110 is secured to the support member 130 by machine screws 39 and 41. Circuit housing 120 is fastened to the opposite side of the support member 130 by any suitable means (not shown).

In some applications it is desirable to provide the weather surface of the protrusion 12 with a corrosion or wear resistant skin, coating or plating. Examples of such coatings may include synthetic resins or metallic plating material such as nickel or the like.

FIG. 4 is a schematic of the various detector operating elements including data flow path and signalling circuits.

The diagram labelled P includes schematics circuitry of heater means 29, magnetic core exciting coil 22 (220), upper strain gauge 27 (270) and lower straing gauge 28 (280) all of which are disposed in the tubular probe 12.

The portion of the diagram labelled H is enclosed in the circuit housing 17 with output circuits "ice light" and "fail light" leading to an instrument panel (not shown).

A pulse current controller 42 excites the coil 22 (220) periodically causing the magnetic core 21 (210) to attract its armature 24 (240). This occurrence places a uniform load on the sidewall 19 (190) of the probe placing the sidewall under uniform compressive stress. Each strain gauge 27 (270) and 28 (280) reads the deformation in its location and transmits the reading to its respective signal processor.

If ice has accreted the deformation is less, i.e., the sidewall 19 (190) stiffens.

Deformation occurs in very small increments, for example, deformation of the sidewall 19 in the ice free condition is of the order of 10–100 microns while deformation of the sidewall with significant accumulations of ice is of the order of 2–20 microns.

Differential strain gauge readings (no ice - ice) form the basis for ice thickness computations.

Strain pulses generally have a duration of 50 milliseconds and occur at approximately two (2) second intervals.

The analog signals from the strain gauges are digitized and are subsequently read at the instrument panel as either "no ice" and/or "no failure".

When a computation indicates that a predetermined value of ice has accreted or that ice has stopped accreting for a predetermined period the heater means 29 cycles "on" to clear the probe of ice and after an appropriate interval the ice free condition is reached and the normal detection procedure begins anew.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A device for detecting the accretion of ice upon a surface exposed to an atmosphere calculated to produce ice upon said surface comprising:
    a protrusion having a surface exposed to the atmosphere,
    power means for stressing the protrusion under a predetermined compressive load sufficient to deform the protrusion in ice free and in ice accreted conditions, and
    measuring means for measuring the extent of deformation in each of said conditions whereby a comparison of said deformation measurements is useful as a measure of the occurrence and of the extent of ice accretion.

2. The device of claim 1 in which said protrusion is metallic.

3. The device of claim 2 in which said protrusion has an interior surface.

4. The device of claim 3 in which said exposed surface is immobile and is sealed relative to said interior surface.

5. The device of claim 4 in which the power means is disposed adjacent the interior surface of said protrusion.

6. The device of claim 5 in which the power means is driven electromagnetically.

7. The device of claim 6 in which the protrusion is connected to a support member which together with said protrusion forms an enclosure.

8. The device of claim 7 in which the power means includes a magnetic core having an energizing coil fixed to one of said support member and said protrusion and an armature is fixed to the other of said support member and said protrusion.

9. The device of claim 8 in which the armature is recessed in the protrusion and the magnetic core is fixed to the support member, said armature being spaced from said magnetic core.

10. The device of claim 8 in which one end of the magnetic core is in threaded engagement with the protrusion and the opposite end thereof is in sliding contact with a guide pin fixed to said support member.

11. The device of claim 10 in which the armature is fixed to said support member at said opposite end of said magnetic core.

12. The device of claim 7 in which the support member is sandwiched between the protrusion on one side and a circuitry housing on the opposite side.

13. The device of claim 12 in which the circuitry housing is sealed from exposure to the atmosphere.

14. The device of claim 3 in which the measuring means for measuring deformation is a strain gauge mounted on the interior surface of said protrusion.

15. The device of claim 3 in which heat means is disposed adjacent the interior surface and is generally co-extensive with said interior surface.

16. The device of claim 2 in which the metallic protrusion defines surface hardened aluminum and said hardened surface is the surface exposed to the atmosphere.

17. The device of claim 2 in which the surface of the protrusion exposed to the atmosphere is coated with a corrosion and wear resistant protective skin or plating.

18. The device of claim 1 in which the measuring means for measuring deformation is a strain gauge.

19. The device of claim 1 in which the protrusion includes a wall element having heat means incorporated therein.

20. The device of claim 1 in which the measuring means for measuring deformation comprises a plurality of strain gauges disposed in circular array.

21. The device of claim 20 in which there is a first array of strain gauges and a second array of strain gauges.

22. A method of detecting and measuring accretion of ice upon a surface exposed to an atmosphere calculated to produce ice upon said surface comprising the steps of:

stressing said surface compressively under a given load in an ice free condition to produce strain or deformation, measuring said strain, stressing said surface compressively under the same load in an ice accreted condition to produce strain or deformation, measuring said strain in said ice accreted condition, comparing the strain measured in the ice free condition to the strain measured in the ice accreted condition, and utilizing the results of the comparison as an indication of the occurrence of ice accretion and as an indication of the degree of ice accretion.

23. The method of claim 22 in which the strains are measured by use of a strain gauge.

24. The method of claim 22 in which the stresses are developed electromagnetically.

25. The method of claim 24 in which the strain measuring steps are synchronized with periodic stressing.

26. The method of claim 22 plus the step of removing ice from said surface when a predetermined degree of ice accretion has occurred.

27. The method of claim 26 wherein the step of removing accreted ice is effected by heating.

28. The method of claim 22 plus the step of shaping said surface in the form of a hollow protrusion or probe.

29. The method of claim 28 wherein the steps of stressing said surface are effected by utilizing power means disposed in the interior of said hollow protrusion.

30. The method of claim 29 wherein the strain measuring steps are effected by utilizing a strain gauge.

* * * * *